United States Patent
Jhou

(10) Patent No.: US 12,413,582 B2
(45) Date of Patent: Sep. 9, 2025

(54) AUTHENTICATION METHOD AND AUTHENTICATION SYSTEM

(71) Applicant: GIGA-BYTE TECHNOLOGY CO., LTD., New Taipei (TW)

(72) Inventor: Yi-Siou Jhou, New Taipei (TW)

(73) Assignee: GIGA-BYTE TECHNOLOGY CO., LTD., New Taipei (TW)

( * ) Notice: Subject to any disclaimer, the term of this patent is extended or adjusted under 35 U.S.C. 154(b) by 245 days.

(21) Appl. No.: 18/313,748

(22) Filed: May 8, 2023

(65) Prior Publication Data

US 2023/0370448 A1    Nov. 16, 2023

(30) Foreign Application Priority Data

May 12, 2022  (TW) ................................. 111117789

(51) Int. Cl.
*H04L 29/00*    (2006.01)
*H04L 9/40*    (2022.01)

(52) U.S. Cl.
CPC .... *H04L 63/0838* (2013.01); *H04L 2463/082* (2013.01)

(58) Field of Classification Search
CPC ........... H04L 63/0838; H04L 2463/082; H04L 63/083
See application file for complete search history.

(56) References Cited

U.S. PATENT DOCUMENTS

| | | | |
|---|---|---|---|
| 8,793,769 B2 * | 7/2014 | Marcia | G06F 21/10 713/176 |
| 9,106,646 B1 | 8/2015 | Zheng | |
| 10,325,088 B2 * | 6/2019 | Chen | H04W 12/08 |
| 11,533,305 B2 * | 12/2022 | Tomita | H04L 63/0861 |

(Continued)

FOREIGN PATENT DOCUMENTS

| | | |
|---|---|---|
| CN | 111931250 A | 11/2020 |
| CN | 108206892 B | 4/2021 |

(Continued)

OTHER PUBLICATIONS

Taiwanese Office Action and Search Report for Taiwanese Application No. 111117789, dated May 5, 2023.

*Primary Examiner* — Don G Zhao
(74) *Attorney, Agent, or Firm* — Birch, Stewart, Kolasch & Birch, LLP

(57) ABSTRACT

An authentication method executed by the processing device of a computer system is provided. The method includes the following operations. The method includes requesting identification information from a user device, in response to receiving an authentication assistance request from the user device. The method further includes receiving the identification information of a second user from the user device. Based on the identification information of the second user, the method further includes determining whether the second user meets an authentication assistance qualification corresponding to a first user. The method further includes requesting a first password from the user device when the second (Continued)

user meets the authentication assistance qualification. The method further includes receiving the first password from the user device and verifying whether the first password is correct using a multi-factor authentication server.

6 Claims, 7 Drawing Sheets

(56) References Cited

U.S. PATENT DOCUMENTS

| | | | |
|---|---|---|---|
| 2009/0113530 A1* | 4/2009 | Brainard | G06F 21/31 726/5 |
| 2016/0004857 A1* | 1/2016 | Chen | H04W 12/126 726/3 |
| 2017/0289168 A1* | 10/2017 | Bar | H04L 63/1408 |
| 2020/0119921 A1* | 4/2020 | Rodriguez | H04L 9/3213 |
| 2022/0407860 A1* | 12/2022 | Kim | H04L 63/102 |
| 2023/0370448 A1* | 11/2023 | Jhou | H04L 63/083 |

FOREIGN PATENT DOCUMENTS

| | | |
|---|---|---|
| CN | 113382405 A | 9/2021 |
| CN | 114238939 A | 3/2022 |
| TW | 201541977 A | 11/2015 |

* cited by examiner

AUTHENTICATION METHOD AND AUTHENTICATION SYSTEM

CROSS REFERENCE TO RELATED APPLICATIONS

This application claims priority of Taiwan Patent Application No. 111117789, filed on May 12, 2022, the entirety of which is incorporated by reference herein.

BACKGROUND OF THE INVENTION

Field of the Invention

The present disclosure relates to computer access control technology, in particular to multi-factor authentication (MFA) technology

Description of the Related Art

Nowadays, various organizations such as enterprises, schools, hospitals, or government agencies have information systems for collecting, processing, storing, and distributing information to support organizational decision-making, control, and management. When a user logs in to the system, besides the basic account and password verification, the user is required to use a mobile device (e.g., a smartphone) as a authentication carrier to perform multi-factor authentication (MFA), which can greatly increase information security.

When some unexpected situation occurs, such as the user forgets to bring the mobile device, the mobile device is lost or damaged, or the mobile device is temporarily out of power, etc., and the user has an urgent need to log in to the system, an alternative authentication method provided by the system is needed.

An existing alternative MFA method is to send a one-time password (OTP) by email for authentication. Since the organization's information system and email system usually share the same account, once the user name and password are cracked and fraudulently used by malicious persons, such the alternative authentication method is of little use.

Another existing MFA method is to ask the user to call the organization's internal specialists for manual authentication. Such authentication method requires a complicated personal data verification process, and its development cost is relatively high. In addition, it is difficult to complete the identity authentication of the user in a short period of time when the organization's internal specialists do not know the user.

Therefore, an authentication method and an authentication system are needed to provide an authentication solution that can take into account both information security and execution efficiency.

BRIEF SUMMARY OF THE INVENTION

An embodiment of the present disclosure provides an authentication method executed by the processing device of a computer system. The method includes the following operations. Identification information is requested from a user device, in response to receiving an authentication assistance request from the user device. The identification information of a second user is received from the user device. The identification information of the second user is used to determine whether the second user meets an authentication assistance qualification corresponding to the first user. When the second user meets the authentication assistance qualification, a first password is requested from the user device. The first password is received from the user device and a multi-factor authentication server is used to verify whether the first password is correct.

In some embodiments, the method further includes the following operations. Authentication information is received from the user device. A determination is made as to whether the authentication information is correct. The correct authentication information belongs to the first user. When the authentication information is correct, the user device is enabled to initiate the authentication assistance request.

In some embodiments, determining whether the second user meets the authentication assistance qualification corresponding to the first user (based on the identification information of the second user) includes the following operations. User information of the first user is obtained based on the authentication information. User information of the second user is obtained based on the identification information of the second user. The user information of the first user and the second user is compared in order to determine whether a predefined relationship exists between the first user and the second user. If there is no predefined relationship between the first user and the second user, then the second user does not meet the authentication assistance qualification.

In some embodiments, a determination is made as to whether the second user meets the authentication assistance qualification corresponding to the first user based on the identification information of the second user. This operation includes the following operations. If the predefined relationship exists between the first user and the second user, a multi-factor authentication account of the second user is requested from the multi-factor authentication server. The operation includes receiving the multi-factor authentication account from the multi-factor authentication server, and requesting a multi-factor authentication carrier list of the second user from the multi-factor authentication server based on the multi-factor authentication account. If at least one multi-factor authentication carrier exists in the multi-factor authentication carrier list, it is determined that the second user meets the authentication assistance qualification. Conversely, if no multi-factor authentication carrier exists in the multi-factor authentication carrier list, the second user does not meet the authentication assistance qualification.

In some embodiments, the operation of determining whether the first password is correct includes the following operations. Based on the first password, the multi-factor authentication server is requested to determine whether the first password is correct. A verification result is returned by the multi-factor verification server. The verification result determines whether the first password is correct.

In some embodiments, the method further includes determining that the first user is using the user device when the first password is correct.

In some embodiments, the method further includes requesting private information of the first user from the user device in response to the first password being correct. The method further includes sending a second password to the first user by email, in response to receiving the correct private information for the first user from the user device. The method further includes requesting the second password from the user device. The method further includes receiving an input password from the user device, and determining whether the input password is the second password. If the input password is the second password, the method further includes determining that the first user is using the user device.

In addition, an embodiment of the present disclosure provides an authentication system including a processing device configured to execute the authentication method described above.

The authentication method and authentication system provided in the present disclosure help verify the identity of the current user of the user device who wants to log in to the system through other trusted users, without the need for complicated and time-consuming personal data verification processes. While improving information security, the execution efficiency of authentication is maintained.

BRIEF DESCRIPTION OF THE DRAWINGS

The present disclosure can be more fully understood by reading the subsequent detailed description and examples with references made to the accompanying drawings. Additionally, it should be appreciated that in the flow diagram of the present disclosure, the order of execution for each block can be changed, and/or some of the blocks can be changed, eliminated, or combined.

DETAILED DESCRIPTION OF THE INVENTION

The following description provides embodiments of the invention, which are intended to describe the basic spirit of the invention, but is not intended to limit the invention. For the actual inventive content, reference must be made to the scope of the claims.

In each of the following embodiments, the same reference numbers represent identical or similar elements or components.

Ordinal terms used in the claims, such as "first," "second," "third," etc., are only for convenience of explanation, and do not imply any precedence relation between one another.

Figure 1:
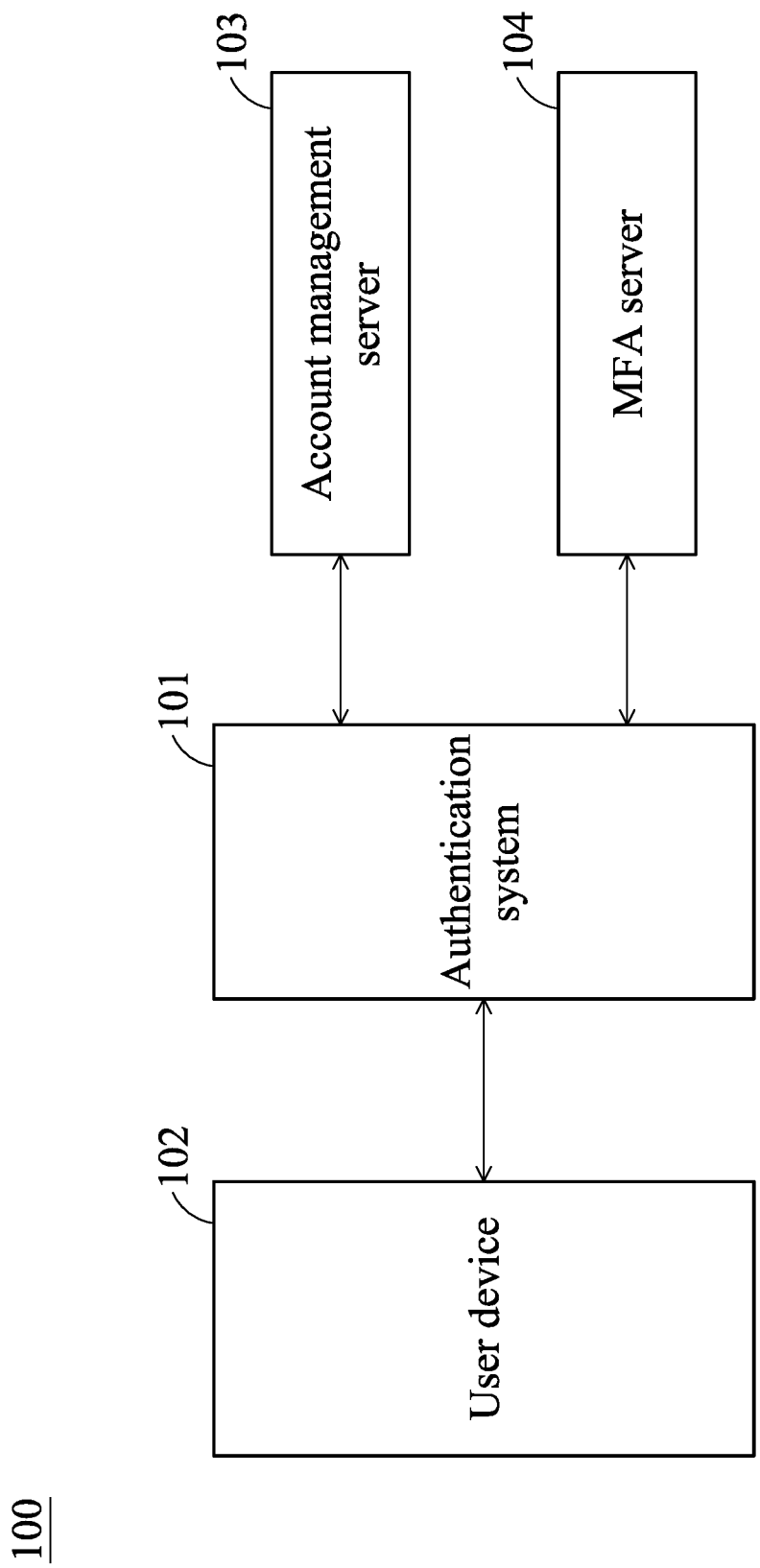
FIG. 1 is a schematic diagram of an application scenario of an authentication system, according to an embodiment of the present disclosure.

FIG. 1 is a schematic diagram of an application scenario 100 of an authentication system 101, according to an embodiment of the present disclosure. As shown in FIG. 1, in the exemplary application scenario 100, the authentication system 101 can communicate with the user device 102 via a network. The authentication system 101 can be electrically coupled to the account management server 103 and the MFA server 104, or connected to the account management server 103 and the MFA server 104 via a network, in order to communicate with the account management server 103 and the MFA server 104.

The authentication system 101, the user device 102, the account management server 103, and the MFA server 104 in FIG. 1 can all be computer systems that use processing devices to perform tasks and communicate with other devices. The processing device may be any device for executing instructions, such as a central processing unit (CPU), a microprocessor, a controller, a microcontroller, or a state machine. In addition to the processing device, the authentication system 101 may further include storage media and computer-readable media. Storage media and computer readable media can be volatile or non-volatile, portable and non-portable, and can be implemented in any method or technology for storing and/or generating data, such as computer-readable instructions, data structures, program modules or other information. Storage media and computer-readable media may further include RAM, ROM, EPROM, EEPROM, flash memory or other memory technologies, CD-ROM, DVD or other optical storage media, magnetic cassettes, tape, magnetic drives, other magnetic storage devices, or any other media that can store the required data and can be accessed by the system device.

In an embodiment of the present disclosure, the authentication system 101 may be a web server. The web server can be (but not limited to) Apache HTTP server, file transfer protocol (FTP) server, common gateway interface (CGI) server, data server, Java server or commercial server that can run various mid-tier applications. The web server can further execute programs or scripts in response to requests from user devices. The web server can be implemented by one or more scripts, or programs written in any programming language. The programming language may be Java®, C, C#, C++, or any scripting language such as Perl, Python, or TCL, and combinations thereof.

In an embodiment of the present disclosure, the user device 102 may be a general-purpose personal computer (e.g., a desktop computer or a laptop) or mobile devices such as smartphones and tablets. In addition to the above-mentioned processing device, storage medium and computer-readable medium, the user device 102 may further include any input device capable of receiving data or instructions input by the user, such as a keyboard, mouse, light pen, and touch screen, etc. The user device 102 has a network connection function, and can transmit the data or instructions input by the user to the authentication system 101 via the network through a web browser or a specific client application program.

In an embodiment of the present disclosure, the account management server 103 can be any server system that provides directory service to manage user accounts in the organization, such as Active Directory (AD) server and Lightweight Directory Access Protocol (LDAP) server, for providing the basic account and password verification service required to log in to the information system.

In an embodiment of the present disclosure, the MFA server 104 is used for providing an additional verification mechanism for the authentication system 101, in addition to the basic account and password verification provided by the account management server 103. The MFA server 104 records the list of mobile carriers registered with each user account, and the mobile carrier (e.g., a smart phone) installs a specific application program to generate a one-time password (OTP) for the MFA server 104 to verify. Then, the MFA server 104 transmits the verification result to the authentication system 101. In some embodiments, the authentication system 101 and the MFA server 104 can communicate through an application programming interface (API). In some embodiments, the MFA server 104 can be electrically coupled to the account management server 103, or connected to the account management server 103 via a network, so that the information of each user account can synchronize with the account management server 103.

Figure 2:
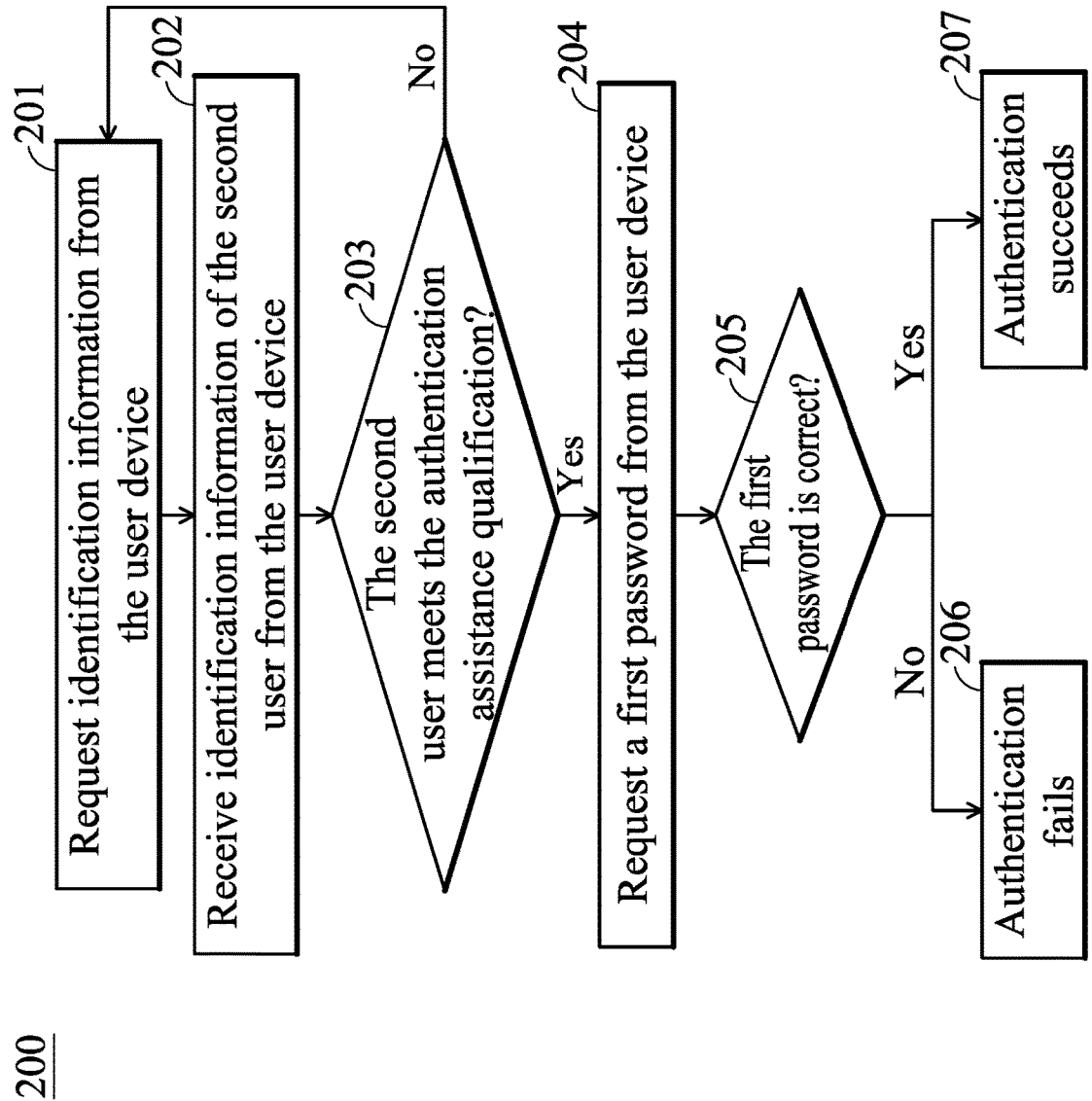
FIG. 2 is a flow diagram of an authentication method, according to an embodiment of the present disclosure.

FIG. 2 is a flow diagram of an authentication method 200, according to an embodiment of the present disclosure. The method 200 is executed by the processing device of the authentication system 101 in FIG. 1. In the example shown in FIG. 2, it is assumed that the user who is currently using the user device (such as the user device 102 in FIG. 1) (the user is hereinafter referred to as the "current user") is trying to use the identity of the first user to log in to the system, and he/she has sent a request for authentication assistance to the system through the user device. It should be noted that the current user of the user device is not necessarily the first user, but may be a malicious person pretending to be the first user. The purpose of the method 200 is to verify whether the current user of the user device is indeed the first user, with the help of trusted users other than the first user. As shown in FIG. 2, the method 200 includes operations 201-207.

In operation 201, in response to receiving an authentication assistance request from the user device, the identification information (e.g., email, student number, job number, or any other information assigned by organizations to identify the users) is requested from the user device. Then, the method 200 proceeds to operation 202.

In the following, it is assumed that the identification information input by the current user through the user device belongs to a second user. In operation 202, identification information of the second user is received from the user device. Then, the method 200 proceeds to operation 203.

In operation 203, based on the identification information of the second user, it is determined whether the second user meets the authentication assistance qualification corresponding to the first user (i.e., whether the second user qualifies for assisting the authentication for the first user). If the second user meets the authentication assistance qualification corresponding to the first user, the method 200 proceeds to operation 204. If the second user does not meet the authentication assistance qualification corresponding to the first user, the method 200 proceeds to operation 201 to request the current user of the user device to re-input the identification information.

In operation 204, a first password is requested from the user device. Then, the method 200 proceeds to operation 205.

In operation 205, the first password is received from the user device, and it is determined through the MFA server whether the first password is correct. If the first password is incorrect, the method proceeds to operation 206. If the first password is correct, the method 200 proceeds to operation 207.

In operation 206, it is determined that the authentication fails, and the current user is not allowed to log in to the system through the user device.

In operation 207, it is determined that the authentication succeeds, and the current user is allowed to log in to the system through the user device.

In an embodiment of the present disclosure, the aforementioned first password is a one-time password (OTP) generated by a specific application program installed on the second user's mobile carrier. Theoretically, the second user who meets the authentication assistance qualification corresponding to the first user should be able to contact the first user and inform the first user of the OTP (i.e., the first password) displayed on the mobile device. In this way, assuming that the current user of the user device is indeed the first user, the correct first password will be known to pass the authentication.

In some embodiments, the aforementioned authentication assistance request is to enable the current user of the user device to adopt an alternative MFA process in unexpected situations (e.g., forgetting to carry the mobile device, losing or damaging the mobile device, or temporarily losing power of the mobile device). Under normal circumstances, current users can perform standard MFA processes through their own mobile carriers. In addition, the current user of the user device can decide to adopt the standard MFA process or an alternative MFA process according to the actual situation (e.g., whether the mobile device is available or not) after passing the first phase of basic account and password verification.

Figure 3A:
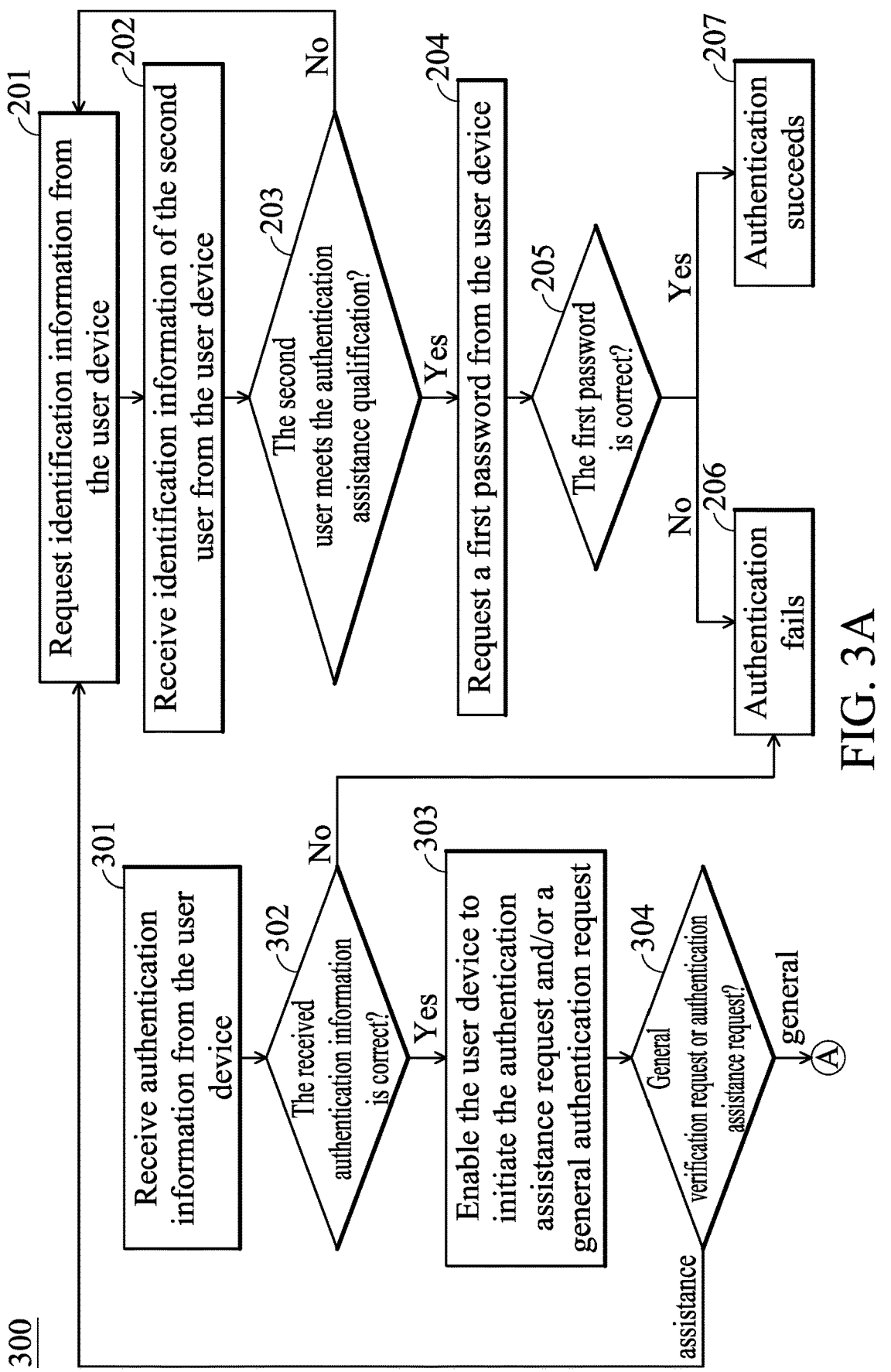
FIG. 3A and FIG. 3B are flow diagrams of an authentication method including basic account and password verification in the first stage, standard MFA process, and alternative MFA process, according to an embodiment of the present disclosure.
Figure 3B:
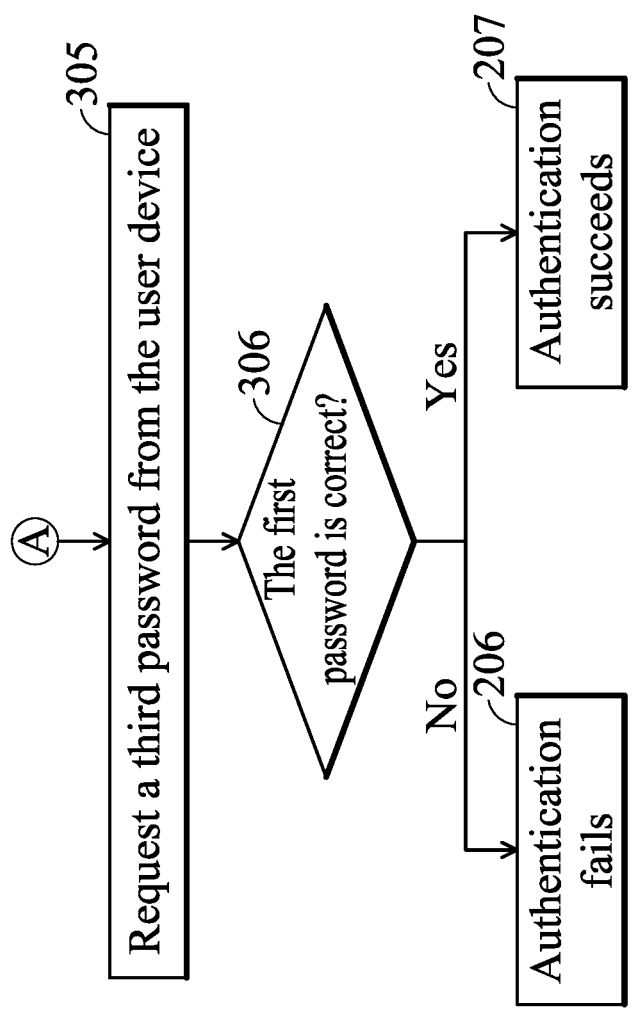

FIG. 3A and FIG. 3B are flow diagrams of an authentication method 300 including basic account and password verification in the first stage, standard MFA process, and alternative MFA process, according to an embodiment of the present disclosure. Compared with the method 200 shown in FIG. 2, the method 300 further includes operations 301-306. The operations 201-207 of the method 300 are substantially the same as the operations 201-207 of the method 200, and will not be described in detail here.

In operation 301 of FIG. 3A, authentication information (e.g., a user ID or username, and a password) is received from the user device. Then, the method 300 proceeds to operation 302.

In operation 302 of FIG. 3A, it is determined whether the received authentication information is correct. If the authentication information is correct, the method 300 proceeds to operation 303. If the authentication information is incorrect, the method 300 proceeds to operation 206 (i.e., determining that the authentication fails).

In operation 303 of FIG. 3A, the user device is enabled to initiate the authentication assistance request and/or a general authentication request. Thus, the current user of the user device can choose to adopt an alternative MFA process or a standard MFA process through the user interface presented by the browser or a specific client application program. Then, the method 300 proceeds to operation 304.

In operation 304 of FIG. 3A, an authentication request is received from the user device, and it is determined whether the received authentication request is a general verification request or an authentication assistance request. If the received verification request is a general authentication request, the method 300 proceeds to operation 305 in FIG. 3B. If the received authentication request is an authentication assistance request, the method 300 proceeds to operation 201 in FIG. 3A.

In operation 305 of FIG. 3B, a third password is requested from the user device. Then, the method 300 proceeds to operation 306.

In operation 306, the third password is received from the user device, and it is verified whether the third password is correct through the MFA server. If the third password is incorrect, the method 300 proceeds to operation 206 (i.e., determining that the authentication fails). If the third password is correct, the method 300 proceeds to operation 207 (i.e., determining that the authentication succeeds).

In an embodiment of the present disclosure, the aforementioned third password is a one-time password (OTP) generated by a specific application program installed on the mobile carrier of the first user. Assuming that the current user of the user device is indeed the first user, the correct third password will be known to pass the authentication.

Figure 4:
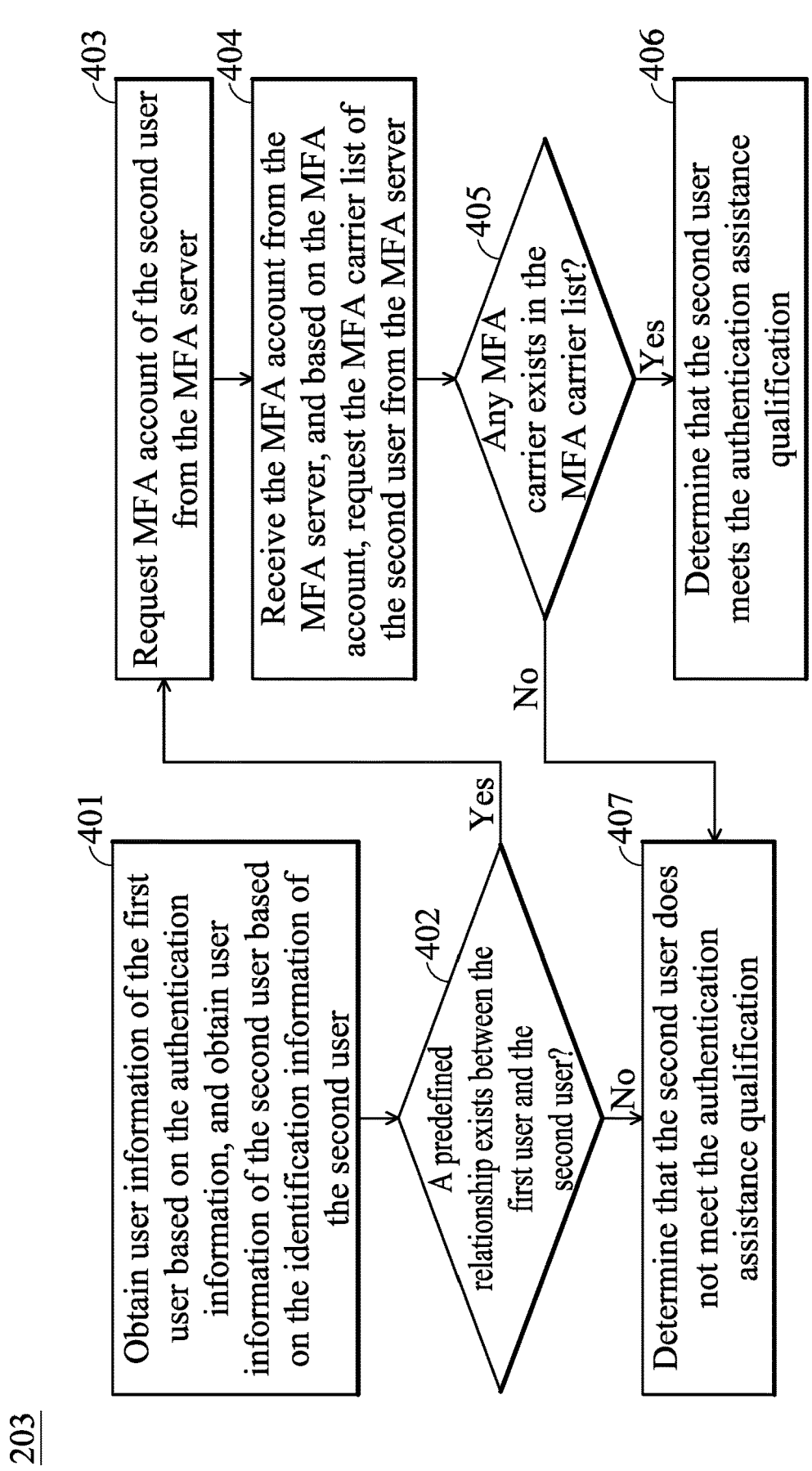
FIG. 4 is a flow diagram illustrating more detailed operations for determining whether the second user meets the authentication assistance qualification corresponding to the first user, according to an embodiment of the present disclosure.

FIG. 4 is a flow diagram illustrating more detailed operations of the operation 203 in FIG. 3A, according to an embodiment of the present disclosure. As shown in FIG. 4, operation 203 may include more detailed operations 401-407.

In operation 401, user information of the first user is obtained based on the authentication information, and user information of the second user is obtained based on the identification information of the second user. Then, the method proceeds to operation 402.

In some embodiments, the authentication system 101 can obtain the user information of the first user and the second user by accessing or querying the human resources database. The human resource database can be stored in the authentication system 101, or can be stored in an external computer device accessible to the authentication system 101, and the present disclosure is not limited thereto.

For example, the user information may include, but not limited to, the company and department to which the user (i.e., the first user or the second user) belongs, the user's job number, and the user's supervisor's job number.

In operation 402, by comparing the user information of the first user and the second user, it is determined whether there is a predefined relationship between the first user and the second user. If there is a predefined relationship between the first user and the second user, the method proceeds to operation 404. If there is no predefined relationship between the first user and the second user, the method proceeds to operation 407.

For example, the predefined relationship may be: (1) the first user and the second user belong to the same company and the same department; (2) the relationship between the first user and the second user is a supervisor-subordinate relationship; or (3) the supervisor of the first user and the second user is the same person, but the present disclosure is not limited thereto.

In operation 403, based on the identification information of the second user, the MFA account of the second user is requested from the MFA server. Then, the method proceeds to operation 404.

In operation 404, the MFA account from the MFA server is received, and based on the MFA account, the MFA carrier list of the second user is requested from the MFA server. Then, the method proceeds to operation 405.

In operation 405, it is verified whether there is an MFA carrier in the MFA carrier list. If there is at least one MFA carrier in the MFA list, the method proceeds to operation 406. If there is no MFA carrier in the MFA list, the method proceeds to operation 407.

In operation 406, it is determined that the second user meets the authentication assistance qualification. In other words, the second user is qualified for assisting in the authentication.

In operation 407, it is determined that the second user does not meet the authentication assistance qualification. In other words, the second user is not qualified for assisting in the authentication.

Figure 5:
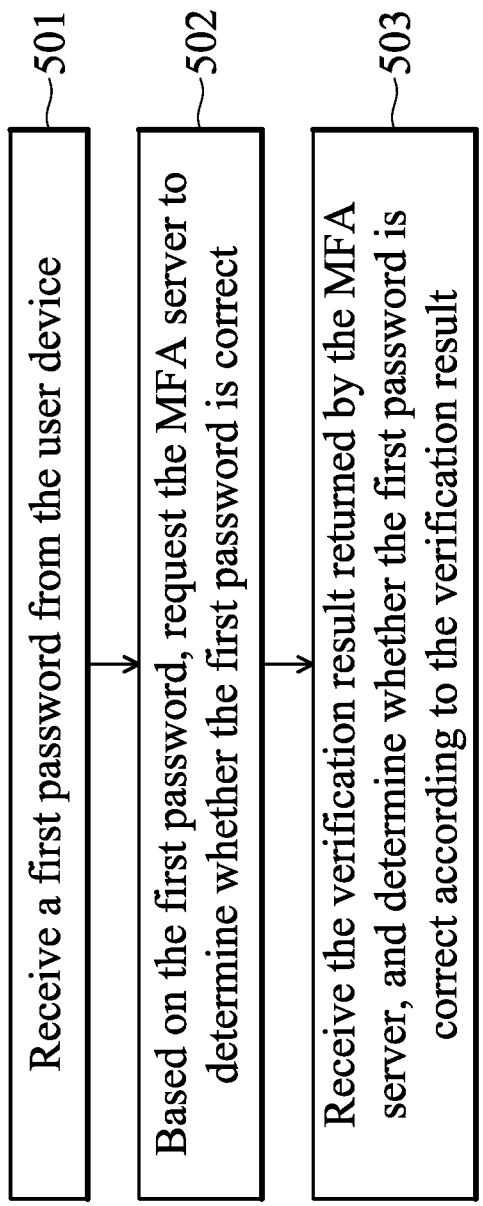
FIG. 5 is a flow diagram illustrating more detailed operations of verifying whether the first password is correct or not, according to an embodiment of the present disclosure.

FIG. 5 is a flow diagram of more detailed operations of the operation 205 in FIG. 2 or FIG. 3A, according to an embodiment of the present disclosure. As shown in FIG. 5, operation 205 may include more detailed operations 501-503.

In operation 501, a first password is received from the user device. Then, the method proceeds to operation 502.

In operation 502, based on the first password, the MFA server is requested to determine whether the first password is correct. Then, the method proceeds to operation 503.

In operation 503, the verification result returned by the MFA server is received, and it is determined according to the verification result whether the first password is correct.

In some embodiments, operation 306 in FIG. 3B may also adopt a process similar to operation 205, the only difference is that the object of verification is the third password instead of the first password.

Figure 6:
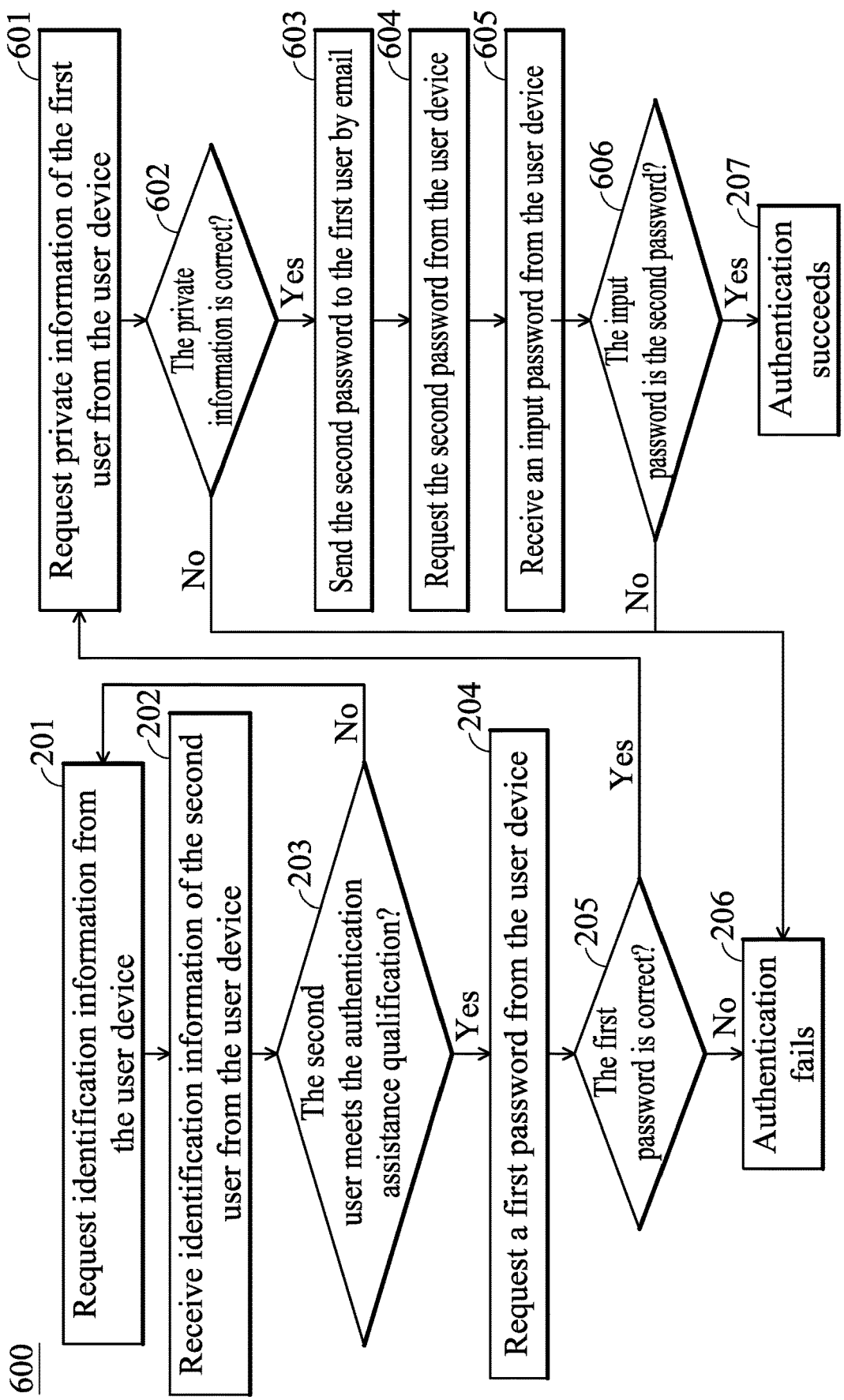
FIG. 6 is a flow diagram of an authentication method, according to an embodiment of the present disclosure.

FIG. 6 is a flow diagram of an authentication method 600, according to an embodiment of the present disclosure. Similar to the method 200 shown in FIG. 2, the method 600 can be executed by the processing device of the authentication system 101 in FIG. 1. However, compared with method 200, method 600 does not directly determine whether the authentication succeeds after determining that the first password is correct in operation 205, but proceeds to operations 601-606 to further determine whether the authentication succeeds.

In operation 601, private information of the first user is requested from the user device. Then, the method proceeds to operation 602. The private information of the first user may be non-public information that is difficult to know except the first user himself, such as the first user's ID number or the name of an emergency contact, but the present disclosure is not limited thereto.

In operation 602, the private information input by the current user through the user device is received, and it is verified whether the received private information is correct (i.e., whether the received private information is indeed the private information of the first user) by accessing or querying the human resources database. If the received private information is incorrect, the method proceeds to operation 206 (i.e., determining that the authentication fails). If the received private information is correct, the method proceeds to operation 603.

In operation 603, the second password is sent to the first user by email. Then, the method proceeds to operation 604. Similar to the first password, the second password can also be an OTP.

In operation 604, the second password is requested from the user device. Then, the method proceeds to operation 605.

In operation 605, an input password (i.e., the password string entered by the current user in response to the request for the second password) is received from the user device. Then, the method proceeds to operation 606.

In operation 606, it is determined whether the input password is the second password. If the input password is the second password, the method proceeds to operation 207 (i.e., determining that the authentication succeeds). If the input password is not the second password, the method proceeds to operation 206 (i.e., determining that the authentication fails).

The method described above can be implemented using computer-executable instructions. These instructions may include, for example, instructions and data that cause a general-purpose computer, special-purpose computer, or special-purpose processing device to perform a specific function or group of functions. Some of the computer resources used can be accessed via the Internet. For example, computer-executable instructions may be binary or intermediate format instructions such as assembly language, firmware, or source code.

The authentication method and authentication system provided in the present disclosure help verify the identity of the current user of the user device who wants to log in to the system through other trusted users, without the need for complicated and time-consuming personal data verification processes. While improving information security, the execution efficiency of authentication is maintained.

The above paragraphs are described with multiple aspects. Obviously, the teachings of the specification may be performed in multiple ways. Any specific structure or function disclosed in examples is only a representative situation. According to the teachings of the specification, it should be noted by those skilled in the art that any aspect disclosed may be performed individually, or that more than two aspects could be combined and performed.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An authentication method, executed by a processing device of a computer system, comprising:
   receiving authentication information from the user device, and determining whether the authentication information belongs to a first user;
   enabling the user device to initiate an authentication assistance request, in response to the authentication information being to the first user;
   requesting identification information from the user device, in response to receiving the authentication assistance request from the user device;
   receiving the identification information of a second user from the user device, and based on the identification information of the second user, determining whether the second user meets an authentication assistance qualification corresponding to the first user;
   requesting a first password from the user device, in response to the second user meeting the authentication assistance qualification;
   receiving the first password from the user device, and verifying whether the first password is correct using a multi-factor authentication server;
   wherein determining whether the second user meets the authentication assistance qualification corresponding to the first user based on the identification information of the second user comprises:
   obtaining user information of the first user based on the authentication information, and obtaining the user information of the second user based on the identification information of the second user;
   by comparing the user information of the first user and the second user, determining whether a predefined relationship exists between the first user and the second user;
   if no predefined relationship exists between the first user and the second user, determining that the second user does not meet the authentication assistance qualification;
   if the predefined relationship exists between the first user and the second user, requesting a multi-factor authentication account of the second user from the multi-factor authentication server;
   receiving the multi-factor authentication account from the multi-factor authentication server, and requesting a multi-factor authentication carrier list of the second user from the multi-factor authentication server based on the multi-factor authentication account;
   if at least one multi-factor authentication carrier exists in the multi-factor authentication carrier list, determining that the second user meets the authentication assistance qualification; and
   if no multi-factor authentication carrier exists in the multi-factor authentication carrier list, determining that the second user does not meet the authentication assistance qualification.

2. The method as claimed in claim 1, wherein the operation of determining whether the first password is correct comprises:
   based on the first password, requesting the multi-factor authentication server to determine whether the first password is correct; and
   receiving a verification result returned by the multi-factor verification server, and determining whether the first password is correct according to the verification result.

3. The method as claimed in claim 1, further comprising:
   requesting private information of the first user from the user device, in response to the first password being correct;
   sending a second password to the first user by email, in response to receiving the correct private information for the first user from the user device;
   requesting the second password from the user device;
   receiving an input password from the user device, and determining whether the input password is the second password; and
   if the input password is the second password, determining that the first user is using the user device.

4. An authentication system, comprising a processing device configured to:
   receive authentication information from a user device, and determine whether the authentication information belongs to a first user;
   enable the user device to initiate an authentication assistance request, in response to the authentication information belongs to the first user;
   request identification information from the user device, in response to receiving the authentication assistance request from the user device;
   receive the identification information of a second user from the user device, and based on the identification information of the second user, determining whether the second user meets an authentication assistance qualification corresponding to the first user;
   request a first password from the user device, in response to the second user meeting the authentication assistance qualification; and
   receive the first password from the user device, and verifying whether the first password is correct using a multi-factor authentication server;
   wherein determining whether the second user meets the authentication assistance qualification corresponding to the first user based on the identification information of the second user comprises:
   obtain user information of the first user based on the authentication information, and obtain the user information of the second user based on the identification information of the second user;
   by comparing the user information of the first user and the second user, determine whether a predefined relationship exists between the first user and the second user;

if no predefined relationship exists between the first user and the second user, determine that the second user does not meet the authentication assistance qualification;

if the predefined relationship exists between the first user and the second user, request a multi-factor authentication account of the second user from the multi-factor authentication server;

receive the multi-factor authentication account from the multi-factor authentication server, and requesting a multi-factor authentication carrier list of the second user from the multi-factor authentication server based on the multi-factor authentication account;

if at least one multi-factor authentication carrier exists in the multi-factor authentication carrier list, determine that the second user meets the authentication assistance qualification; and if no multi-factor authentication carrier exists in the multi-factor authentication carrier list, determine that the second user does not meet the authentication assistance qualification.

5. The system as claimed in claim 4, wherein the operation of determining whether the first password is correct comprises:

based on the first password, requesting the multi-factor authentication server to determine whether the first password is correct; and receiving a verification result returned by the multi-factor verification server, and determining whether the first password is correct according to the verification result.

6. The system as claimed in claim 4, wherein the processing device is further configured to:

request private information of the first user from the user device, in response to the first password being correct;

send a second password to the first user by email, in response to receiving the correct private information for the first user from the user device;

request the second password from the user device;

receive an input password from the user device, and determining whether the input password is the second password; and if the input password is the second password, determine that the first user is using the user device.

\* \* \* \* \*